US011476967B2

(12) United States Patent
Geng et al.

(10) Patent No.: US 11,476,967 B2
(45) Date of Patent: Oct. 18, 2022

(54) METHOD, APPARATUS AND SYSTEM FOR CHANNEL MANAGEMENT IN PASSIVE OPTICAL NETWORK

(71) Applicant: Nokia Solutions and Networks Oy, Espoo (FI)

(72) Inventors: Dan Geng, Shanghai (CN); Werner Van Hoof, Aartselaar (BE); Lina Guo, Shanghai (CN); Lifei Sun, Shanghai (CN)

(73) Assignee: Nokia Solutions and Networks, Oy Espoo (FI)

( * ) Notice: Subject to any disclaimer, the term of this patent is extended or adjusted under 35 U.S.C. 154(b) by 0 days.

(21) Appl. No.: 17/226,666

(22) Filed: Apr. 9, 2021

(65) Prior Publication Data

US 2021/0320743 A1     Oct. 14, 2021

(30) Foreign Application Priority Data

Apr. 10, 2020  (CN) .......................... 202010280142.3

(51) Int. Cl.
*H04J 14/02*       (2006.01)
*H04Q 11/00*     (2006.01)

(52) U.S. Cl.
CPC ...... *H04J 14/0227* (2013.01); *H04Q 11/0067* (2013.01)

(58) Field of Classification Search
CPC .... H04J 14/02; H04J 14/0227; H04J 14/0232; H04J 14/0235; H04Q 11/0067
See application file for complete search history.

(56) References Cited

U.S. PATENT DOCUMENTS

| | | | |
|---|---|---|---|
| 9,749,076 B2 * | 8/2017 | Wen | .................... H04J 14/0249 |
| 2011/0276825 A1 | 11/2011 | Dong et al. | |
| 2015/0365191 A1 * | 12/2015 | Lee | ..................... H04J 14/0246 |
| | | | 398/67 |

(Continued)

FOREIGN PATENT DOCUMENTS

| | | |
|---|---|---|
| CN | 101483792 A | 7/2009 |
| CN | 103248417 A | 8/2013 |

(Continued)

OTHER PUBLICATIONS

Office Action dated Aug. 18, 2022 in Chinese Application No. 202010280142.3.

(Continued)

*Primary Examiner* — Dzung D Tran
(74) *Attorney, Agent, or Firm* — Harness, Dickey & Pierce, P.L.C.

(57) ABSTRACT

A method for channel management in an optical network unit includes receiving a disable channel action message sent by an optical line terminal, wherein the disable channel action message is used to instruct disabling a first channel of the optical network unit; transferring the state machine of the optical network unit on the first channel from the association substate of the operation state to the pending substate according to the disable channel action message; and turning off the transmitter and/or the receiver on the first channel after a specified time is reached, transferring the state machine from the pending substate of the operation state to the disabling channel status, and starting a timer.

15 Claims, 4 Drawing Sheets

(56) References Cited

U.S. PATENT DOCUMENTS

| | | | |
|---|---|---|---|
| 2016/0072607 A1 | 3/2016 | Wen | |
| 2017/0303020 A1* | 10/2017 | Ye | H04J 14/0223 |
| 2018/0034579 A1 | 2/2018 | Liu et al. | |
| 2018/0359032 A1* | 12/2018 | Sone | H04B 10/25752 |
| 2021/0152249 A1* | 5/2021 | Gao | H04J 14/00 |

FOREIGN PATENT DOCUMENTS

| | | |
|---|---|---|
| CN | 106686474 A | 5/2017 |
| CN | 108476082 A | 8/2018 |

OTHER PUBLICATIONS

G. Chaoqin 'Issues on Optical Transportation Network Protection and Restoration Combined Technology' China Academic Journal Electronic Publishing House, *IEEE*, 2004, pp. 45-48.

E. Harstead et al. 'Technology Roadmap for Time-Division Multiplexed Passive Optical Networks (TDM PONs)' *Journal of Lightwave Technology*, IEEE, vol. 37, No. 2, 2019, pp. 657-664.

H. Ujikawa et al. 'Demonstration of Timer-based ONU Deep Sleep for Emergency Communication during Power Failure' *Globecom—Optical Networks and Systems Symposium*, IEEE Xplore, 2013, pp. 1-5.

\* cited by examiner

METHOD, APPARATUS AND SYSTEM FOR CHANNEL MANAGEMENT IN PASSIVE OPTICAL NETWORK

CROSS-REFERENCE TO RELATED APPLICATIONS

The present application claims priority under 35 U.S.C. § 119 to Chinese Patent Application No. 202010280142.3, filed on Apr. 10, 2020, in the Chinese Patent Office, the entire contents of each of which are hereby incorporated by reference.

TECHNICAL FIELD

The present disclosure relates to the field of wired communication technologies, and in particular relates to a technical scheme for channel management in Passive Optical Network (PON).

BACKGROUND

PON is a system used to provide network access at the last kilometer, PON includes OLTs (Optical Line Terminals) installed at a central control station and supporting ONUs (Optical Network Units) installed at user's site. G.HSP.comTC defines a higher speed TWDM PON TC layer, the system supports both channel-bonded ONUs and channel-unbonded ONUs, a channel-bonded ONU may support different number of channels.

SUMMARY

The object of the present disclosure is to provide a method, apparatus and system for channel management in a passive optical network.

According to an embodiment of the present disclosure, there is provided a method for channel management in an optical network unit, wherein the method comprises:

receiving a disable channel action message sent by an optical line terminal, wherein the disable channel action message is used to instruct disabling a first channel of the optical network unit;

transferring the state of the optical network unit on the first channel from the operation state to the pending state according to the disable channel action message.

According to another embodiment of the present disclosure, there is also provided a method for channel management, wherein the method comprises:

an optical line terminal sends a disable channel action message to an optical network unit, wherein the disable channel action message is used to instruct disabling a first channel of the optical network unit;

the optical network unit receives the disable channel action message sent by the optical line terminal;

the optical network unit transfers the state of the optical network unit on the first channel from operation state to the pending state according to the disable channel action message.

According to another embodiment of the present disclosure, there is also provided an apparatus for channel management in an optical network unit, where the apparatus comprises:

means for receiving a disable channel action message sent by an optical line terminal, wherein the disable channel action message is used to instruct disabling a first channel of the optical network unit;

means for transferring the state of the optical network unit on the first channel from the operation state to the pending state according to the disable channel action message.

According to an embodiment of the present disclosure, there is provided a method for channel management in an optical network unit, wherein the method comprises:

receiving a disable channel action message sent by an optical line terminal, wherein the disable channel action message is used to instruct disabling a first channel of the optical network unit;

transferring the state machine of the optical network unit on the first channel from the association substate of the operation state to the pending substate according to the disable channel action message;

and turning off the transmitter and/or the receiver on the first channel after a specified time is reached, transferring the state machine from the pending substate of the operation state to the disabling channel status, and starting a timer.

According to another embodiment of the present disclosure, there is also provided a method for channel management, wherein the method comprises:

an optical line terminal sends a disable channel action message to an optical network unit, wherein the disable channel action message is used to instruct disabling a first channel of the optical network unit;

the optical network unit receives the disable channel action message sent by the optical line terminal;

the optical network unit transfers the state machine of the optical network unit on the first channel from the association substate of the operation state to the pending substate according to the disable channel action message;

the optical network unit turns off the transmitter and/or the receiver on the first channel after a specified time is reached, transfers the state machine from the pending substate of the operation state to the disabling channel status, and starts a timer.

According to another embodiment of the present disclosure, there is also provided an apparatus for channel management in an optical network unit, where the apparatus comprises:

means for receiving a disable channel action message sent by an optical line terminal, wherein the disable channel action message is used to instruct disabling a first channel of the optical network unit;

means for transferring the state machine of the optical network unit on the first channel from the association substate of the operation state to the pending substate according to the disable channel action message;

means for turning off the transmitter and/or the receiver on the first channel after a specified time is reached, transferring the state machine from the pending substate of the operation state to the disabling channel status, and starting a timer.

According to another embodiment of the present disclosure, there is also provided a system for channel management in a passive optical network, wherein the system comprises an optical line terminal and an optical network unit, the optical network unit comprises the apparatus for channel management described in the present disclosure.

According to another embodiment of the present disclosure, there is also provided an optical network unit, where the optical network unit comprises:

a memory for storing one or more programs;

one or more processors connected with the memory, the one or more programs, when executed by the one or more processors, cause the one or more processors to perform the following operations:

receiving a disable channel action message sent by an optical line terminal, wherein the disable channel action message is used to instruct disabling a first channel of the optical network unit;

transferring the state machine of the optical network unit on the first channel from the association substate of the operation state to the pending substate according to the disable channel action message;

and turning off the transmitter and/or the receiver on the first channel after a specified time is reached, transferring the state machine from the pending substate of the operation state to the disabling channel status, and starting a timer.

According to another embodiment of the present disclosure, there is also provided a computer readable storage medium storing a computer program, which when executed by a processor, cause the processor to perform the following operations:

receiving a disable channel action message sent by an optical line terminal, wherein the disable channel action message is used to instruct disabling a first channel of the optical network unit;

transferring the state machine of the optical network unit on the first channel from the association substate of the operation state to the pending substate according to the disable channel action message;

and turning off the transmitter and/or the receiver on the first channel after a specified time is reached, transferring the state machine from the pending substate of the operation state to the disabling channel status, and starting a timer.

Compared with the prior art, the method has the following advantages: a state machine of timing and handshake mechanism after ONU performs the operation of disabling channel or enabling channel is provided, so that ONU can quickly recover the service after disabling the channel; and/or, channel action message and channel action response message that support disabling channel, enabling channel and inquiring channel status are proposed for GPON type OLT and ONU.

BRIEF DESCRIPTION OF THE DRAWINGS

Other features, objectives, and advantages of the present disclosure will become more apparent through reading the following detailed depiction of the non-limitative embodiments with reference to the accompanying drawings.

Same or similar reference numbers in the drawings represent the same or similar components.

DETAILED DESCRIPTION

Figure 1:
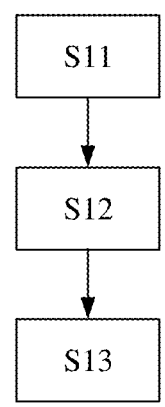
FIG. 1 shows a flowchart of a method for channel management in an optical network unit according to an embodiment of the present disclosure.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be rearranged. The processes may be terminated when its operations are completed, but may also have additional steps not included in the figure. The processes may correspond to methods, functions, procedures, subroutines, subprograms, etc.

The "device" mentioned in this context refers to the smart electronic device that can carry out numerical computations and/or logical computations and other predetermined processing procedures through running predetermined programs or instructions, and may comprise a processor and a memory. It is by the processor that the program instructions prestored in the memory are executed to carry out the predetermined processing procedures, or by Application Specific Integrated Circuit (ASIC), Field Programmable Gate Array (FPGA), Digital Signal Processor (DSP) and other like hardware that the predetermined processing procedures are carried out, or some combination of the two mentioned scenarios.

The methods (some of which are showed by flowcharts) discussed infra may be implemented through hardware, software, firmware, middleware, microcode, hardware description language or any combination thereof. When they are implemented with software, firmware, middleware or microcode, the program code or code segment for executing essential tasks may be stored in a machine or a computer readable medium (e.g., storage medium). (One or more) processors may implement essential tasks.

The specific structures and function details disclosed here are only representative, for a purpose of describing the exemplary embodiments of the present disclosure. The present disclosure, however, may be specifically implemented through many alternative embodiments, and should not be construed as limited to only the embodiments illustrated here.

It will be understood that although terms "first," "second" might be used here to describe respective units, these units should not be limited by these terms. Use of these terms is only for distinguishing one unit from another. For example, without departing from the scope of the exemplary embodiments, the first unit may be referred to as the second unit, and similarly the second unit may be referred to as the first unit. The term "and/or" used here includes any and all combinations of one or more associated items as listed.

The terms used here are only for describing preferred embodiments, not intended to limit exemplary embodiments. Unless otherwise indicated, singular forms "a" or "one" used here further intends to include plural forms. It should also be appreciated that the terms "comprise" and/or "include" used here prescribe existence of features, integers, steps, operations, units and/or components as stated, but do not exclude existence or addition of one or more other features, integers, steps, operations, units, components, and/or a combination thereof.

It should also be noted that in some alternative embodiments, the functions/actions as mentioned may occur in an order different from what is indicated in the drawings. For example, dependent on the functions/actions involved, two successively illustrated diagrams may be executed substantially simultaneously or in a reverse order sometimes.

The present disclosure finds that when ONU supports multiple channels, there may be functional requirements as follows: 1) after the ONU goes to the operation state, OLT may need to disable some channels of the ONU for power saving or other reasons, and after disabling some channels, the OLT may need to re-enable some channels to obtain higher rate service; 2) in some scenarios, such as after performing the operations of disabling or enabling channel(s), the OLT may need to request the ONU's response or current wavelength channel in order to avoid the non-compliant actions between the OLT and the ONU. However, the existing PON does not have a solution to the above technical problems, how to enable and disable ONU channel, and how ONU implements handshake and recover its service in time after disabling and enabling channel are problems that need to be solved urgently.

After discovering the above the technical problems, the present disclosure proposes a timing and handshake mechanism after ONU performs the operation of disabling channel or enabling channel, so that ONU can quickly recover the service after disabling the channel, and proposes channel action message and channel action response message that support disabling channel, enabling channel and inquiring channel status.

Hereinafter, further detailed description will be made to the present disclosure with reference to the accompanying drawings.

The present disclosure provides a method for channel management in an optical network unit, wherein the method comprises: receiving a disable channel action message sent by an optical line terminal, wherein the disable channel action message is used to instruct disabling a first channel of the optical network unit; transferring the state of the optical network unit on the first channel from the operation state to the pending state according to the disable channel action message. In this context, the "pending state" may also be referred to as the "pending substate". In some embodiments, ONU transfers the state of the ONU on the first channel from the association substate of the operation state to the pending substate according to the disable channel action message. The related concepts and operations are described in detail in the subsequent embodiments, and will not be repeated here. It should be noted that in this disclosure, transferring the state of the ONU on the first channel from one state to another state is also regarded as the state transition of the state machine of the ONU on the first channel.

FIG. 1 shows a flowchart of a method for channel management in an optical network unit according to an embodiment of the present disclosure. The method includes step S11, step S12, and step S13. In step S11, an optical network unit receives a disable channel action message sent by an optical line terminal, wherein the disable channel action message is used to instruct disabling a first channel of the optical network unit; in step S12, the ONU transfers the state machine of the optical network unit on the first channel from the association substate of the operation state to the pending substate according to the disable channel action message; in step S13, the ONU turns off the transmitter and/or the receiver on the first channel after a specified time is reached, transferring the state machine from the pending substate of the operation state to the disabling channel status, and starting a timer.

In step S11, an optical network unit receives a disable channel action message sent by an optical line terminal, wherein the disable channel action message is used to instruct disabling a first channel of the optical network unit. Wherein the optical network unit supports multiple channels, and the optical network unit refers to a bonded ONU (providing wavelength channel bonded services). In some embodiments, after the ONU completes activation of all its wavelength channels, the OLT enables all the wavelength channels of the ONU, and after the ONU goes to the operation state, the OLT may send a disable channel action message to the ONU for power saving or any other possible reasons, to disable an Upstream wavelength channel and/or a Downstream wavelength channel of a certain channel of the ONU. Wherein, the first channel may be any channel associated with the ONU, the first channel is currently in an associated substate (O5.1) of the operation state (O5), and the OLT may select the first channel to be disabled from a plurality of channels associated with the ONU in any feasible manner, which is not limited in this disclosure. In some embodiments, the disable channel action message is used to instruct disabling the upstream wavelength Channel and/or the downstream wavelength Channel of the first Channel, and the disable channel action message includes, but is not limited to, ONU-ID (optical network unit identifier), message type identifier for instructing channel action, an identifier of the first channel, an indication for indicating to perform disable action (e.g. includes a first indication for indicating to disable the upstream channel and a second indication for indicating to disable the downstream channel), scheduled SFC, padding, message integrity check, and the like. In some embodiments, the disable channel action message is a PLOAM (Physical Layer Operations, Administration and Maintenance) message or an OMCI (ONU Management and Control Interface) message, the related contents will be described in detail in the following embodiments and will not be repeated here.

In step S12, the ONU transfers the state machine of the ONU on the first channel from the association substate of the operation state to the pending substate (O5.2) according to the disable channel action message. Wherein the ONU corresponds to a state machine on each channel it is associated with, for example, the ONU supports channel0 and channel1, channel0 corresponds to a state machine of the ONU, and channel1 corresponds to a state machine of the ONU. As an example, the ONU receives a disable channel action message from the OLT, the disable channel action message indicates to disable the upstream channel and the downstream channel of channel1, and then the state machine of the ONU on the channel is transferred from O5.1 state to the O5.2 state.

In step S13, the ONU turns off the transmitter and/or the receiver on the first channel after a specified time is reached, transferring the state machine from the pending substate of the operation state to the disabling channel status, and starting a timer. Wherein the disabling channel status (referred to as "O10" in this disclosure) is a new state of the ONU proposed in this disclosure, and if one channel of the OUN is in the disabling channel status, it indicates that the upstream wavelength channel and/or the downstream wavelength channel of this channel is currently disabled. In some embodiments, the disable channel action message is used to instruct disabling the upstream wavelength channel and the downstream wavelength channel of the first channel, when the superframe counter reaches the matching condition, it means that a specified time is reached, turn off the upstream transmitter and the downstream receiver on the first channel to disable the first channel, and then transfer the state machine corresponding to the first channel from the pending substate (O5.2) to the disabling channel status, and start a timer. In some embodiments, the disable channel action message is used to instruct disabling the upstream wavelength channel of the first channel, when the superframe counter reaches the matching condition, it means that a specified time is reached, turn off the upstream transmitter on the first channel, and then transfer the state machine corresponding to the first channel from the O5.2 state to the disabling channel status. In some embodiments, the disable channel action message is used to instruct disabling the downstream wavelength channel of the first channel, when the superframe counter reaches the matching condition, it means that a specified time is reached, turn off the downstream receiver on the first channel, and then transfer the state machine corresponding to the first channel from the O5.2 state to the disabling channel status.

In some embodiments, the disable channel action message carries a scheduled SFC (Super Frame Counter), said turning off the transmitter and/or the receiver on the first channel after a specified time is reached comprises: turning off the transmitter and/or the receiver on the first channel when it is determined that a specified time is reached according to the scheduled SFC. In some embodiments, the scheduled SFC is applicable to both downstream and upstream disabled channels, or only to upstream disabled channels, and the scheduled SFC is used to inform when to perform the operation of disabling or enabling channel. As an example, the disable channel action message carries scheduled SFC, the upstream transmitter and/or the downstream receiver on the first channel is turned off when the scheduled SFC matches the first channel.

In some embodiments, the method further comprises: enabling the first channel according to an enable channel action message if the enable channel action message for enabling the first channel is received before the timer expires; transferring the state machine from the disabling channel status to the profile learning substate (O8.2) of the downstream tuning state (O8, DS Tuning State) if a downstream synchronization signal is received on the first channel before the timer expires; transferring the state machine from the profile learning substate of the downstream tuning state to the upstream tuning state (O9, US Tuning State) when the downstream wavelength channel of the first channel works normally; sending an enable channel action response message for action confirmation to the optical line terminal on the first channel; transferring the state machine from the upstream tuning state to the operation state when the upstream wavelength channel of the first channel works normally. In some embodiments, OLT sends the enable channel action message through other channel currently enabled by the ONU, for example, the channels supported by the ONU include channel0 and channel1, and after disabling the upstream and downstream of channel1, the OLT may send the enable channel action message through channel0 to re-enable channel1. In some embodiments, the upstream transmitter and/or the downstream receiver of the first channel are enabled according to the enable channel action message to enable the upstream wavelength channel and/or the downstream wavelength channel of the first channel. Therefore, based on the ONU state machine migration mechanism provided in this disclosure, OLT can quickly recover service after disabling a channel.

In some embodiments, the enable channel action message is used to instruct enabling the upstream wavelength channel and/or the downstream wavelength channel of the first channel; in some embodiments, the enable channel action message and the disable channel action message use the same data format, and the enable channel action message and the disable channel action message include, but are not limited to: ONU-ID, message type identifier for instructing channel action, an identifier of the first channel, an indicator for indicating to perform enable action (e.g., including an indicator for indicating to enable upstream channel and an indicator for indicating to enable downstream channel), scheduled SFC, padding, message integrity check, and the like. In some embodiments, the enable channel action response message is used to indicate the action result of the enable channel action message; in some embodiments, the enable channel action response message includes, but is not limited to, ONU-ID, message type identifier, a serial number, identifier of the first channel, action result of whether the first channel is successfully enabled, upstream channel status, downstream channel status, padding, message integrity checking, and the like. In some embodiments, the enable channel action message and the disable channel action message include at least any one of: ONU-ID, message type identifier, WLCH identifier (e.g., DWLCH identifier, UWLCH identifier), action flag (e.g., upstream action flag, downstream action flag), padding, message integrity check; the enable channel action response message includes at least any one of: ONU-ID, message type identifier, sequence number, WLCH identifier, channel status (e.g., upstream channel status, downstream channel status), action result, padding, message integrity check. In some embodiments, each channel action message and channel action response message involved in the context are based on the same protocol, each channel action message involved in the context adopts the same data format, and each channel action response message involved in the context adopts the same data format; for example, the disable channel action message, enable channel action message, and inquiry channel action message in the context are in the same data format, and the enable channel action response message in the context is in the same data format as the inquiry channel action response message.

Specifically, if an enable channel inquiry message for enabling the first channel is received and a downstream synchronization signal is received on the first channel before the constraint timer of disabling channel status expires, the state machine of the ONU on the first channel is transferred from the disabling channel status (O10) to the profile learning substate (O8.2) of the downstream tuning state, and then the state machine is transferred from O8.2 to O9 when the downstream wavelength channel (DWLCH) of the first channel works normally (ok to work), and an enable channel action response message for action confirmation is sent to the OLT when the upstream wavelength channel (UWLCH) of the first channel works normally.

In some embodiments, the method further comprises: transferring the state machine from the disabling channel status to the profile learning substate (O1.2) of the initial state (O1) if the enable channel action message is not received before the timer expires; transferring, after receiving the enable channel action message, the state machine from the disabling channel status to the profile learning substate of the initial state if a downstream synchronization signal is not received on the first channel before the timer expires. As an example, the ONU starts a timer TO6 when the state machine of the first channel transfers to the disabling channel status, and if the TO6 expires and does not receive an enable channel action message for enabling the first channel, the state machine transfers from the disabling channel status to the O1.2 state. As another example, the ONU starts a timer TO6 when the state machine of the first channel is transfers to the disabling channel status, and if an enable channel action message for enabling the first channel sent by the OLT is received before TO6 expires, but a downstream synchronization signal (DSYNC) is not received before TO6 expires, the state machine transfers from the disabling channel status to the O1.2 state.

In some embodiments, the method further comprises: transferring the state machine from the disabling channel status to the profile learning substate of the initial state if a deactivate ONU-ID request sent by the optical line terminal is received before the timer expires; transferring the state machine from the disabling channel status to the emergency stop state (O7) if a disable SN request sent by the optical line terminal is received before the timer expires. For example, the ONU starts a timer TO6 when the state machine of the first channel transfers to the disabling channel status, and transfers the state machine from O10 to state O1.2 if the deactivate ONU-ID request is received before TO6 expires. For another example, the ONU starts a timer TO6 when the state machine of the first channel transfers to the disabling channel status, and transfers the state machine from O10 to O7 when a disable SN Request sent by the OLT is received before TO6 expires.

In some embodiments, the method further comprises: receiving an inquiry channel action message sent by the optical line terminal, wherein the inquiry channel action message is used for inquiring the channel status of ONU channel; returning an inquiry channel action response message to the optical line terminal according to the inquiry channel action message, wherein the inquiry channel action response message is used for indicating the channel status of ONU channel. In some embodiments, the inquiry channel action message may be used to inquiry the upstream and/or downstream channel status of any channel associated with the ONU, optionally, the inquiry channel action message includes but is not limited to: ONU-ID, message type identifier, channel identifier, an indicator for indicating perform operation to inquiry channel status, padding, message integrity check, etc. In some embodiments, the inquiry channel action response message is used to indicate the inquiry result, and includes, but is not limited to, ONU-ID, message type identifier, serial number, channel identifier, upstream channel status, downstream channel status, padding, message integrity check, and the like. In some embodiments, the inquiry channel action message and the disable channel action message use the same data format; in some embodiments, the inquiry channel action message and the disable channel action message include at least any one of: ONU-ID, message type identifier, WLCH identifier, action flag, padding, message integrity check; the inquiry channel action response message includes at least any one of: ONU-ID, message type identifier, sequence number, WLCH identifier, upstream channel status, downstream channel status, action result, padding, message integrity check.

In some embodiments, each channel action message, such as disable channel action message or enable channel action message or inquiry channel action message in the context, includes at least any one of: ONU-ID, message type identifier, DWLCH identifier, UWLCH identifier, upstream action flag, downstream action flag, scheduled SFC, padding and message integrity check. In some embodiments, each channel action response message, such as enable channel action response message or inquiry channel action response message in the context, includes at least any one of: ONU-ID, message type identifier, sequence number, DWLCH identifier, UWLCH identifier, upstream channel status, downstream channel status, action result, padding and message integrity check. In some embodiments, each of the channel action message and the channel action response message is a PLOAM message, that is, information interaction between OLT and ONU for channel management is implemented based on the PLOAM protocol. In other embodiments, each of the channel action message and the channel action response message is an OMCI message, that is, information interaction between the OLT and ONU for channel management is implemented based on the OMCI protocol.

The following exemplarily describes the implementation manner based on PLOAM protocol and OMCI protocol respectively:

1) information interaction for channel management is implemented based on the PLOAM protocol The following Table 1 shows the data format of the downstream PLOAM-channel action message of an example of the present disclosure. Wherein, "Octet" represents a byte, "Content" represents contents corresponding to the corresponding byte, and "Description" represents description of the corresponding byte. As can be seen from Table 1, bytes 1-2 of the channel action message correspond to ONU-ID, that is, an ONU identifier of a message receiver; byte 3 corresponds to message type identifier, the message type is "Channel action", and its hexadecimal representation is "0xxx"; byte 4 corresponds to sequence number (SeqNo), which is repeated from downstream Request Registration Message or 0 if generated in response to a ranging grant in the ranging state (O4); byte 5 corresponds to Downstream channel action request, and its bitmap can be represented as "DDDD00AA", wherein "DDDD" is DWLCH ID (downstream wavelength channel identifier), "AA" is Action flag, and is defined as "AA=00: No action requested; AA=01: Request channel status; AA=10:Disable channel; AA=11: Enable channel", the action flag indicated by AA in this byte is for the downstream wavelength channel; byte 6 corresponds to Upstream channel action request, and its bitmap can be represented as "UUUU00AA", wherein, "UUUU" is UWLCH ID (upstream wavelength channel identifier), "AA" is Action Flag, and is defined as "AA=00: No action requested; AA=01: Request channel status; AA=10: Disable channel; AA=11: Enable channel", the action flag indicated by AA in this byte is for the upstream wavelength channel; bytes 7-8 correspond to scheduled SFC, i.e. the 16 least significant bits of the superframe counter value of the PHY frame when the ONU has to commence a "disable channel" operation, wherein the specific value pertains to both downstream and upstream disable channel, or only upstream disable channel; bytes 9-40 correspond to padding content, set to 0x00 by the transmitter, and treated as "don't care" by the receiver; bytes 41-48 correspond to the MIC (Message integrity check), which is computed using the default PLOAM integrity key.

TABLE 1

| Octet | Content | Description |
|---|---|---|
| 1-2 | ONU-ID | ONU-ID of message transmitter |
| 3 | Message type ID | 0xxx, "Channel action" |
| 4 | SeqNo | Repeated from downstream Request Registration message, or 0 if generated in response to a ranging grant in the Ranging state |
| 5 | Downstream channel action request | A bitmap of the form DDDD00AA |
| 6 | Upstream channel action request | A bitmap of the form UUUU00AA |
| 7-8 | Scheduled SFC | The 16 least significant bits of the superframe counter value of the PHY frame when the ONU has to commence "Disable channel" operation; The specified value pertains to both downstream and upstream "Disable channel", or only upstream "Disable channel" |
| 9-40 | Padding | Set to 0x00 by the transmitter, treated as "don't care" by the receiver |

TABLE 1-continued

| Octet | Content | Description |
|---|---|---|
| 41-48 | MIC | Message integrity check computed using default PLOAM integrity key |

The following Table 2 shows the data format of the upstream PLOAM-channel action response message of an example of the present disclosure, the channel action response message is also called channel status and action result message because the channel action response message has a function of returning channel status and action result. As can be seen from Table 2, bytes 1-2 of the channel status and action result message correspond to ONU-ID, that is, an ONU identifier of a message receiver; byte 3 corresponds to message type identifier, the message type is "Channel status and response", and its hexadecimal representation is "0xxx"; byte 4 corresponds to sequence number (SeqNo), which is repeated from downstream Request Registration Message or 0 if generated in response to a ranging grant in the ranging state (O4); byte 5 corresponds to Channel identifier (Channel ID), and the bitmap form is "DDDDUUUU", wherein "DDDD" is DWLCH ID, and "UUUU" is UWLCH ID; byte 6 corresponds to Channel State, and the bitmap is "DDDOOUUU", wherein "DDD" represents Downstream Channel State, and is defined as "DDD=000: Channel absence; DDD=001: Channel enabled; DDD=010: Channel disabled; DDD=011: Channel failure; DDD=100 . . . 111: Reserved, ignored on received", "UUU" represents Upstream Channel State, and is defined as "UUU=000: No channel; UUU=001: Channel enabled; UUU=010: Channel disabled; UUU=011: Channel failure; UUU=100 . . . 111: reserved, ignore on received"; byte 7 corresponds to Action Result, and the bitmap form is "DDD00UUU", wherein "DDD" represents Downstream Channel Action Result, and is defined as "DDD=000: No action requested; DDD=001: Action successful; DDD=010: Action failed; DDD=011: No change required, i.e. the channel is already in the request state; DDD=100: Invalid command, i.e., request for an operation on a non-existing channel; DDD=101 . . . 111: Reserved, ignored on received, "UUU" represents Upstream Channel Action Result, and is defined as "UUU=000: No action requested; UUU=001: Action successful; UUU=010: Action failed; UUU=011: No change required, i.e. the channel is already in the request state; UUU=100: Invalid command, i.e., request for an operation on a non-existing channel; UUU=101 . . . 111: Reserved, ignore on received"; bytes 8-40 correspond to padding, set to 0x00 by the transmitter, and treated as "don't care" by the receiver; bytes 41-48 correspond to the MIC, which is computed using the default PLOAM integrity key.

TABLE 2

| Octet | Content | Description |
|---|---|---|
| 1-2 | ONU-ID | ONU-ID of message sender |
| 3 | Message type ID | 0xxx, "Channel status and response" |
| 4 | SeqNo | Repeated from downstream Request Registration message, or 0 if generated in response to a ranging grant in the ranging state |
| 5 | Channel ID | A bitmap of the form DDDD UUUU |
| 6 | Channel status | A bitmap of the form DDD00 UUU |
| 7 | Action result | A bitmap of the form DDD00 UUU |

TABLE 2-continued

| Octet | Content | Description |
|---|---|---|
| 8-40 | Padding | Set to 0x00 by the transmitter, treated as "don't care" by the receiver |
| 41-48 | MIC | Message integrity check computed using default PLOAM integrity key |

Each channel action message in the present disclosure may adopt the data format shown in Table 1, and each channel action response message may adopt the data format shown in Table 2. It should be noted that the channel action message shown in Table 1 and the channel status action response message shown in table 2 are only examples, and are not limited to the present disclosure, and in practical applications, the data format of the channel action message and the corresponding channel action response message may be defined based on requirements, so that the channel action message and the corresponding channel action response message can support functions of disabling a channel and/or enabling a channel and/or querying channel status.

2) information interaction for channel management is implemented based on the OMCI protocol The following exemplarily provides a variety of implementation manners of information interaction for implementing channel management based on the OMCI protocol.

a) extending new attributes in existing OMCI message(s)

As an example: TWDM channel management entity provides anchor point for the ME involved in the collection of PM statistical information for each TWDM channel, the instance of the TWDM channel management entity is instantiated by the ONU autonomously, a plurality of new attributes can be expanded in the TWDM Channel management entity, each new attribute corresponds to at least one item of channel action messages or at least one item of channel action response messages, and the attributes of the expanded TWDM Channel management entity include Managed entity ID, Active Channel indication, Operational Channel indication, Downstream wavelength channel, Upstream wavelength Channel, Specific wavelength Channel action flag, Scheduled SFC, ONU Channel status and action result. Wherein, the Managed entry ID is used for uniquely identifying each instance of the ME, which is 2 bytes, and is represented as 0xSSBB, where SS represents ONU slot ID, and BB represents TWDM channel ME number allocated by the ONU itself, and is arranged in ascending order from 0; Active channel indication, the default value is false, ONU will set the attribute to true when receiving a Channel_Profile PLOAM message of the channel, and ONU will clear the attribute when receiving a Channel_Profile PLOAM message marked with 'void' of the channel, the attribute is 1 byte; Operational channel indication, a boolean attribute, set to true for the active TWDM channel currently running on the ONT, the operation statistics are accumulated in the PM history data ME associated with the TWDM channel, this attribute is 1 byte; Downstream wavelength channel, for an active TWDM channel, the attribute identity refers to downstream wavelength channel of table 11-2 of [ITU-T G.989.2], for an inactive channel, its value is 0xFF; Upstream wavelength channel, for an active TWDM channel, the attribute identity refers to upstream wavelength channel of table VIII-5 of [ITU-T G.989.2], for an invalid channel, its value is 0xFF. Wherein, Specific wavelength channel action flag, Scheduled SFC, ONU Channel status and Action result are new extended attributes; Specific wavelength channel action flag attribute is used to request specific channel status of ONU, disable channel, enable channel, and the attribute is 2 bytes, a bitmap form of byte 1 is "DDDDUUUU", DDDD "is DWLCH ID of a specific channel, "UUUU" is UWLCH ID of a specific channel, a bitmap form of byte 2 is "AA0000BB", AA is defined as "AA=00: No action requested; AA=01: Request downstream channel status; AA=10: Disabled downstream channel; AA=11: Enable downstream channel", BB is defined as "BB=00: No action requested; BB=01: Request upstream channel status; BB=10: Disable upstream channel; BB=11: Enable upstream channel"; Scheduled SFC attribute, OLT uses this attribute to inform ONU when to perform disable or enable specific downstream and upstream channel operations, the attribute is 2 bytes, the value of which is the 16 least significant bits of the superframe counter value of the PHY frame when the ONU has to commence "disable channel" operation, the specific value pertains to both downstream and upstream disable channel, or only to upstream disable channel; ONU Channel status and Action result attribute is used to report specific downstream and upstream Channel status and report upstream and downstream action result of specific Channel, the attribute is 3 bytes, the bitmap form of the first byte is "DDDDUUUU", "DDDD" is DWLCH ID of specific channel, "UUUU" is UWLCH ID of specific channel, the bitmap form of the second byte is "AAA00BBB", AAA represents downstream channel status, and is defined as "AAA=000: Channel absent; AAA=001: Channel enabled; AAA=010: Channel disabled; AAA=011: Channel failure; AAA=100 . . . 111: Reserved, ignored on reception", BBB represents upstream channel status, and is defined as "BBB=000: Channel absent; BBB=001: Channel enabled; BBB=010: Channel disabled; BBB=011: Channel failure; BBB=100 . . . 111: Reserved, ignored on reception", the bitmap form of the third byte is "RRR00SSS", RRR represents downstream channel action result, and is defined as "RRR=000: No action requested; RRR=001: Action succeeded; RRR=010: Action failed; RRR=011: No change required, i.e., the channel is already in the requested state; RRR=100: Invalid command, i.e., request for an operation on a non-existing channel; RRR=101 . . . 111: Reserved, ignored on reception", SSS represents upstream channel action result, and is defined as "SSS=000: No action requested; SSS=001: Action succeeded; SSS=010: the Action failed; SSS=011: No change required, i.e., the channel is already in the requested state; SSS=100: Invalid command, i.e., request for an operation on a non-existing channel; SSS=101 . . . 111: Reserved, ignored on reception".

b) a first management entity is newly created, and the attributes of the first management entity include a management entity identifier, DWLCH, UWLCH, and a plurality of first attributes, wherein each first attribute corresponds to at least one item of the channel action message or at least one item of the channel action response message. The first management entity may provide OLT with functions of requesting channel status of ONU, disabling wavelength channel of ONU, enabling wavelength channel of ONU, and providing ONU with functions of responding to a current channel status and an action result of the OLT. The one or more instances of the first management entity are implicitly associated with the TWDM system profile ME, the number of instances created is announced by the TWDM channel total attribute of the TWDM system profile ME.

As an example, create TWDM channel operation entry includeing the following attributes: Managed entity ID, Downstream wavelength channel, Upstream wavelength channel, Specific wavelength channel action flag, Scheduled SFC, ONU Channel status and Action result; wherein, each attribute in the TWDM channel operation entry is defined the same as the attribute with the same name in the foregoing implementation manner a), and is not described again here.

c) a second management entity and a third management entity are newly created, the attributes of the second management entity include a management entity identifier, DWLCH, UWLCH, and a plurality of second attributes, wherein each second attribute corresponds to at least one item of the channel action message; the attributes of the third management entity include a management entity identifier, DWLCH, UWLCH, and a plurality of third attributes, wherein each third attribute corresponds to at least one item of the channel action response message. The second management entity is used for providing OLT with the functions of requesting channel status of ONU, disabling wavelength channel of ONU and enabling wavelength channel of ONU, the third management entity is used for providing ONU with the function of responding to the current channel status and the action result of OLT.

As an example, two MEs are newly created as follows: TWDM channel operation entry-1 and TWDM channel operation entry-2. Wherein, the TWDM channel operation entry-1 provides OLT with the functions of requesting channel status of ONU, disabling wavelength channel of ONU and enabling wavelength channel of ONU, the TWDM channel operation entry-2 provides ONU with the functions of responding to the current channel status and the action result of the OLT. Wherein, the TWDM channel operation entry-1 includes the following attributes: Managed entity ID, Downstream wavelength channel, Upstream wavelength channel, Specific wavelength channel action flag, Scheduled SFC. Wherein, the TWDM channel operation entry-2 includes the following attributes: Managed entity ID, Downstream wavelength channel, Upstream wavelength channel, ONU Channel status and Action result. Wherein, the definition of each attribute in the two MEs is the same as that of the attribute with the same name in the foregoing implementation manner a), and is not described herein again.

Figure 2:
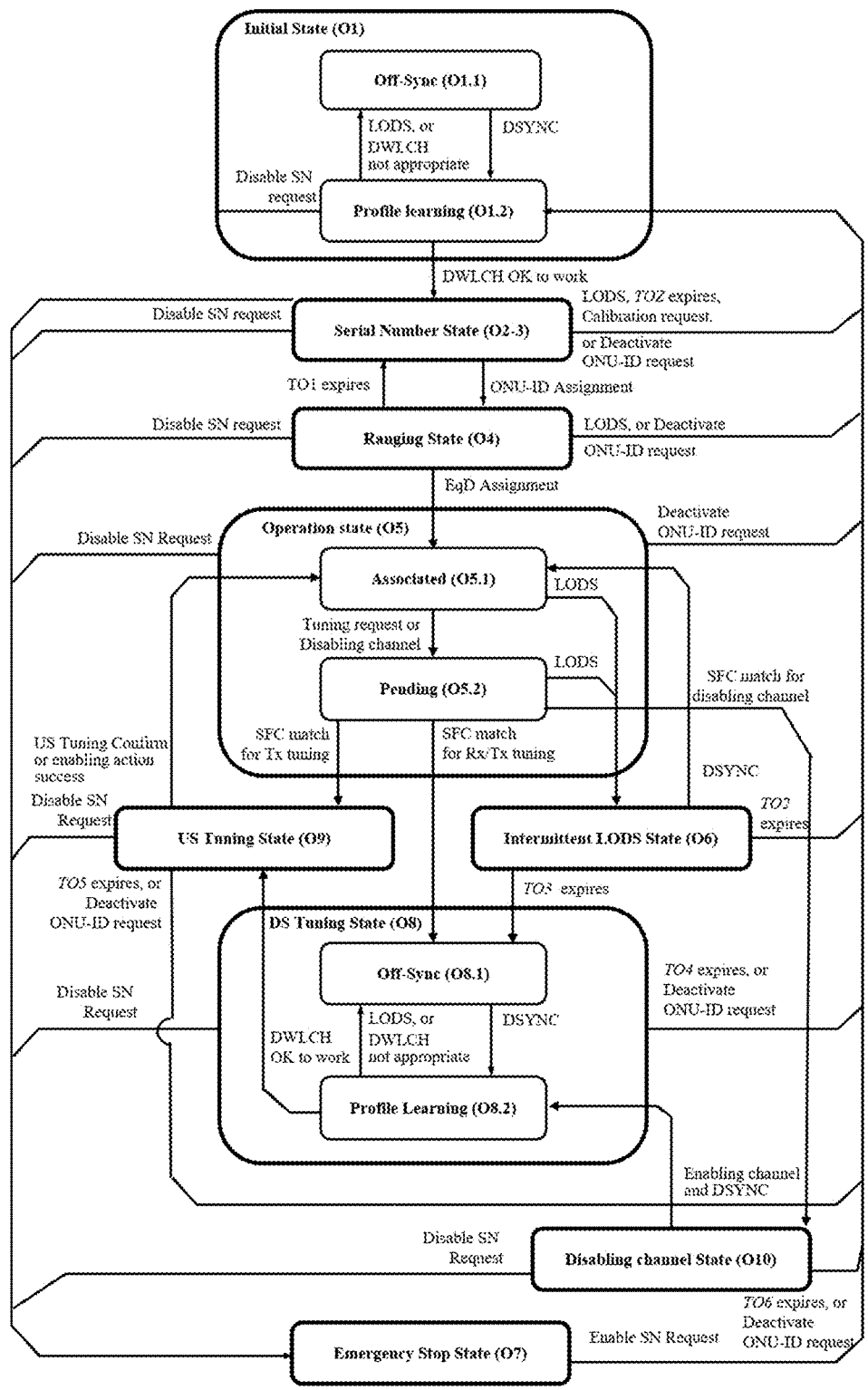
FIG. 2 shows a state machine diagram of an optical network unit according to an example of the present disclosure.

FIG. 2 shows a state machine diagram of an optical network unit according to an example of the present disclosure. This example proposes a new state O10 (disabled channel status) based on the existing O1-O9, and proposes a state machine including a timing and handshake mechanism after ONU performs the disabled channel or enabled channel operation based on O1-O10. Assuming that the ONU supports channel0 and channel1, if the OLT wants to disable the upstream and downstream channels of the ONU on channel1 and send a command on channel0 to re-enable channel1, the ONU on channel1 can use the ONU state machine shown in FIG. 2, and the following is only exemplarily explained for the state transition process when the ONU in FIG. 2 performs the channel disabling or channel enabling operation (other state transition process can be referred to FIG. 12-1 in G.989.3): after the ONU enters the O5 state, after receiving a disable channel action message (i.e. Disabling channel shown in FIG. 2) with scheduled SFC and for disabling channel1, the state machine of channel1 transfers from the O5.1 state to the O5.2 state, and when the scheduled SFC matches the disable channel1 (i.e. SFC match for disabling channel), the ONU turns off the downstream receiver and upstream transmitter on channel1, transfers from the O5.2 state to the O10 state and starts timer TO6; when the ONU receives an enable channel action message for enabling channel1, enable the downstream wavelength channel and the upstream wavelength channel of channel1 on channel0 (enable upstream transmitter and downstream receiver of channel1), and receives downstream synchronization (DSYSC) on channel1 before TO6 expires, the ONU transfers from the O10 state to the O8.2 state, and when the downstream wavelength channel of channel1 is operational (DWLCH OK to work), the ONU transfers from the O8.2 state to the O9 state, after the ONU on channel1 sends an upstream channel status and action result message to notify OLT "enabling action success", the ONU on channel1 transfers from the O9 state to the O5 state. Wherein, if the ONU on channel1 does not receive a channel action message for enabling channel1 before timeout, or does not receive a downstream synchronization before timeout even though the ONU receives a channel action message for enabling channel1, or receives a Disable SN Request, or receives a Deactivate ONU-ID Request, the ONU on channel1 transfers from O10 to O1.2 state.

The present disclosure also proposes a method for channel management in a passive optical network, the method comprises: an optical line terminal sends a disable channel action message to an optical network unit, wherein the disable channel action message is used to instruct disabling a first channel of the optical network unit; the optical network unit receives the disable channel action message sent by the optical line terminal; the optical network unit transfers the state machine of the optical network unit on the first channel from the association substate of the operation state to the pending substate according to the disable channel action message; the optical network unit turns off the transmitter and/or the receiver on the first channel after a specified time is reached, transfers the state machine from the pending substate of the operation state to the disabling channel status, and starts a timer. The related operations have been described in detail in the foregoing embodiments, and are not described in detail herein.

The present disclosure provides an apparatus for channel management in an optical network unit, wherein the apparatus comprises: means for receiving a disable channel action message sent by an optical line terminal, wherein the disable channel action message is used to instruct disabling a first channel of the optical network unit; means for transferring the state of the optical network unit on the first channel from the operation state to the pending state according to the disable channel action message. In this context, the "pending state" may also be referred to as the "pending substate". In some embodiments, ONU transfers the state of the ONU on the first channel from the association substate of the operation state to the pending substate according to the disable channel action message. The related concepts and operations are described in detail in the subsequent embodiments, and will not be repeated here. It should be noted that in this disclosure, transferring the state of the ONU on the first channel from one state to another state is also regarded as the state transition of the state machine of the ONU on the first channel.

Figure 3:
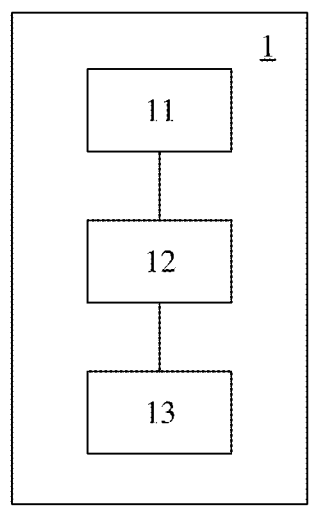
FIG. 3 shows a structural diagram of an apparatus for channel management in an optical network unit according to an embodiment of the present disclosure.

FIG. 3 shows a structural diagram of an apparatus for channel management in an optical network unit according to an embodiment of the present disclosure. The apparatus for channel management (hereinafter simply referred to as "channel management apparatus 1") includes a reception means 11, a first transfer means 12, and a second transfer means 13.

The reception means 11 is configured to receive a disable channel action message sent by an optical line terminal, wherein the disable channel action message is used to instruct disabling a first channel of the optical network unit. Wherein the optical network unit supports multiple channels, and the optical network unit refers to a bonded ONU (providing wavelength channel bonded services). In some embodiments, after the ONU completes activation of all its wavelength channels, the OLT enables all the wavelength channels of the ONU, and after the ONU goes to the operation state, the OLT may send a disable channel action message to the ONU for power saving or any other possible reasons, to disable an Upstream wavelength channel and/or a Downstream wavelength channel of a certain channel of the ONU. Wherein, the first channel may be any channel associated with the ONU, the first channel is currently in an associated substate of the operation state, and the OLT may select the first channel to be disabled from a plurality of channels associated with the ONU in any feasible manner, which is not limited in this disclosure. In some embodiments, the disable channel action message is used to instruct disabling the upstream wavelength Channel and/or the downstream wavelength Channel of the first Channel, and the disable channel action message includes, but is not limited to, ONU-ID, message type identifier for instructing channel action, an identifier of the first channel, an indication for indicating to perform disable action (e.g. includes a first indication for indicating to disable the upstream channel and a second indication for indicating to disable the downstream channel), scheduled SFC, padding, message integrity check, and the like. In some embodiments, the disable channel action message is a PLOAM message or an OMCI message, the related contents will be described in detail in the following embodiments and will not be repeated here.

The first transfer means 12 is configured to transfer the state machine of the ONU on the first channel from the association substate of the operation state to the pending substate according to the disable channel action message. Wherein the ONU corresponds to a state machine on each channel it is associated with, for example, the ONU supports channel0 and channel1, channel0 corresponds to a state machine of the ONU, and channel1 corresponds to a state machine of the ONU. As an example, the reception means 11 receives a disable channel action message from the OLT, the disable channel action message indicates to disable the upstream channel and the downstream channel of channel1, and the first transfer means 12 transfers the state machine of the ONU on the channel from O5.1 state to the O5.2 state.

The second transfer means 13 is configured to turn off the transmitter and/or the receiver on the first channel after a specified time is reached, transferring the state machine from the pending substate of the operation state to the disabling channel status, and starting a timer. Wherein the disabling channel status (referred to as "O10" in this disclosure) is a new state of the ONU proposed in this disclosure, and if one channel of the OUN is in the disabling channel status, it indicates that the upstream wavelength channel and/or the downstream wavelength channel of this channel is currently disabled. In some embodiments, the disable channel action message is used to instruct disabling the upstream wavelength channel and the downstream wavelength channel of the first channel, when the superframe counter reaches the matching condition, it means that a specified time is reached, turn off the upstream transmitter and the downstream receiver on the first channel to disable the first channel, and then transfer the state machine corresponding to the first channel from the pending substate to the disabling channel status, and start a timer. In some embodiments, the disable channel action message is used to instruct disabling the upstream wavelength channel of the first channel, when the superframe counter reaches the matching condition, it means that a specified time is reached, turn off the upstream transmitter on the first channel, and then transfer the state machine corresponding to the first channel from the O5.2 state to the disabling channel status. In some embodiments, the disable channel action message is used to instruct disabling the downstream wavelength channel of the first channel, when the superframe counter reaches the matching condition, it means that a specified time is reached, turn off the downstream receiver on the first channel, and then transfer the state machine corresponding to the first channel from the O5.2 state to the disabling channel status.

In some embodiments, the disable channel action message carries a scheduled SFC (Super Frame Counter), said turning off the transmitter and/or the receiver on the first channel after a specified time is reached comprises: turning off the transmitter and/or the receiver on the first channel when it is determined that a specified time is reached according to the scheduled SFC. In some embodiments, the scheduled SFC is applicable to both downstream and upstream disabled channels, or only to upstream disabled channels, and the scheduled SFC is used to inform when to perform the operation of disabling or enabling channel. As an example, the disable channel action message carries scheduled SFC, the upstream transmitter and/or the downstream receiver on the first channel is turned off when the scheduled SFC matches the first channel.

In some embodiments, the channel management apparatus 1 is further configured to: enable the first channel according to an enable channel action message if the enable channel action message for enabling the first channel is received before the timer expires; transferring the state machine from the disabling channel status to the profile learning substate of the downstream tuning state if a downstream synchronization signal is received on the first channel before the timer expires; transferring the state machine from the profile learning substate of the downstream tuning state to the upstream tuning state when the downstream wavelength channel of the first channel works normally; sending an enable channel action response message for action confirmation to the optical line terminal on the first channel; transferring the state machine from the upstream tuning state to the operation state when the upstream wavelength channel of the first channel works normally. In some embodiments, OLT sends the enable channel action message through other channel currently enabled by the ONU, for example, the channels supported by the ONU include channel0 and channel1, and after disabling the upstream and downstream of channel1, the OLT may send the enable channel action message through channel0 to re-enable channel1. In some embodiments, the upstream transmitter and/or the downstream receiver of the first channel are enabled according to the enable channel action message to enable the upstream wavelength channel and/or the downstream wavelength channel of the first channel. Therefore, based on the ONU state machine migration mechanism provided in this disclosure, OLT can quickly recover service after disabling a channel.

In some embodiments, the enable channel action message is used to instruct enabling the upstream wavelength channel and/or the downstream wavelength channel of the first channel; in some embodiments, the enable channel action message and the disable channel action message use the same data format, and the enable channel action message and the disable channel action message include, but are not limited to: ONU-ID, message type identifier for instructing channel action, an identifier of the first channel, an indicator for indicating to perform enable action (e.g., including an indicator for indicating to enable upstream channel and an indicator for indicating to enable downstream channel), scheduled SFC, padding, message integrity check, and the like. In some embodiments, the enable channel action response message is used to indicate the action result of the enable channel action message; in some embodiments, the enable channel action response message includes, but is not limited to, ONU-ID, message type identifier, a serial number, identifier of the first channel, action result of whether the first channel is successfully enabled, upstream channel status, downstream channel status, padding, message integrity checking, and the like. In some embodiments, the enable channel action message and the disable channel action message include at least any one of: ONU-ID, message type identifier, WLCH identifier (e.g., DWLCH identifier, UWLCH identifier), action flag (e.g., upstream action flag, downstream action flag), padding, message integrity check; the enable channel action response message includes at least any one of: ONU-ID, message type identifier, sequence number, WLCH identifier, channel status (e.g., upstream channel status, downstream channel status), action result, padding, message integrity check. In some embodiments, each channel action message and channel action response message involved in the context are based on the same protocol, each channel action message involved in the context adopts the same data format, and each channel action response message involved in the context adopts the same data format; for example, the disable channel action message, enable channel action message, and inquiry channel action message in the context are in the same data format, and the enable channel action response message in the context is in the same data format as the inquiry channel action response message.

Specifically, if an enable channel inquiry message for enabling the first channel is received and a downstream synchronization signal is received on the first channel before the constraint timer of disabling channel status expires, the state machine of the ONU on the first channel is transferred from the disabling channel status (O10) to the profile learning substate of the downstream tuning state, and then the state machine is transferred from O8.2 to O9 when the downstream wavelength channel of the first channel works normally, and an enable channel action response message for action confirmation is sent to the OLT when the upstream wavelength channel of the first channel works normally.

In some embodiments, the channel management apparatus 1 is further configured to: transfer the state machine from the disabling channel status to the profile learning substate of the initial state if the enable channel action message is not received before the timer expires; transferring, after receiving the enable channel action message, the state machine from the disabling channel status to the profile learning substate of the initial state if a downstream synchronization signal is not received on the first channel before the timer expires. As an example, the ONU starts a timer TO6 when the state machine of the first channel transfers to the disabling channel status, and if the TO6 expires and does not receive an enable channel action message for enabling the first channel, the state machine transfers from the disabling channel status to the O1.2 state. As another example, the ONU starts a timer TO6 when the state machine of the first channel is transfers to the disabling channel status, and if an enable channel action message for enabling the first channel sent by the OLT is received before TO6 expires, but a downstream synchronization signal (DSYNC) is not received before TO6 expires, the state machine transfers from the disabling channel status to the O1.2 state.

In some embodiments, the channel management apparatus 1 is further configured to: transfer the state machine from the disabling channel status to the profile learning substate of the initial state if a deactivate ONU-ID request sent by the optical line terminal is received before the timer expires; transferring the state machine from the disabling channel status to the emergency stop state if a disable SN request sent by the optical line terminal is received before the timer expires. For example, the ONU starts a timer TO6 when the state machine of the first channel transfers to the disabling channel status, and transfers the state machine from O10 to state O1.2 if the deactivate ONU-ID request is received before TO6 expires. For another example, the ONU starts a timer TO6 when the state machine of the first channel transfers to the disabling channel status, and transfers the state machine from O10 to O7 when a disable SN Request sent by the OLT is received before TO6 expires.

In some embodiments, the channel management apparatus 1 is further configured to: receive an inquiry channel action message sent by the optical line terminal, wherein the inquiry channel action message is used for inquiring the channel status of ONU channel; returning an inquiry channel action response message to the optical line terminal according to the inquiry channel action message, wherein the inquiry channel action response message is used for indicating the channel status of ONU channel. In some embodiments, the inquiry channel action message may be used to inquiry the upstream and/or downstream channel status of any channel associated with the ONU, optionally, the inquiry channel action message includes but is not limited to: ONU-ID, message type identifier, channel identifier, an indicator for indicating perform operation to inquiry channel status, padding, message integrity check, etc. In some embodiments, the inquiry channel action response message is used to indicate the inquiry result, and includes, but is not limited to, ONU-ID, message type identifier, serial number, channel identifier, upstream channel status, downstream channel status, padding, message integrity check, and the like. In some embodiments, the inquiry channel action message and the disable channel action message use the same data format; in some embodiments, the inquiry channel action message and the disable channel action message include at least any one of: ONU-ID, message type identifier, WLCH identifier, action flag, padding, message integrity check; the inquiry channel action response message includes at least any one of: ONU-ID, message type identifier, sequence number, WLCH identifier, upstream channel status, downstream channel status, action result, padding, message integrity check.

In some embodiments, each channel action message, such as disable channel action message or enable channel action message or inquiry channel action message in the context, includes at least any one of: ONU-ID, message type identifier, DWLCH identifier, UWLCH identifier, upstream action flag, downstream action flag, scheduled SFC, padding and message integrity check. In some embodiments, each channel action response message, such as enable channel action response message or inquiry channel action response message in the context, includes at least any one of: ONU-ID, message type identifier, sequence number, DWLCH identifier, UWLCH identifier, upstream channel status, downstream channel status, action result, padding and message integrity check. In some embodiments, each of the channel action message and the channel action response message is a PLOAM message, that is, information interaction between OLT and ONU for channel management is implemented based on the PLOAM protocol. In other embodiments, each of the channel action message and the channel action response message is an OMCI message, that is, information interaction between the OLT and ONU for channel management is implemented based on the OMCI protocol.

The following exemplarily describes the implementation manner based on PLOAM protocol and OMCI protocol respectively:

1) information interaction for channel management is implemented based on the PLOAM protocol The above Table 1 shows the data format of the downstream PLOAM-channel action message of an example of the present disclosure. Wherein, "Octet" represents a byte, "Content" represents contents corresponding to the corresponding byte, and "Description" represents description of the corresponding byte. As can be seen from Table 1, bytes 1-2 of the channel action message correspond to ONU-ID, that is, an ONU identifier of a message receiver; byte 3 corresponds to message type identifier, the message type is "Channel action", and its hexadecimal representation is "0xxx"; byte 4 corresponds to sequence number (SeqNo), which is repeated from downstream Request Registration Message or 0 if generated in response to a ranging grant in the ranging state (O4); byte 5 corresponds to Downstream channel action request, and its bitmap can be represented as "DDDD00AA", wherein "DDDD" is DWLCH ID (downstream wavelength channel identifier), "AA" is Action flag, and is defined as "AA=00: No action requested; AA=01: Request channel status; AA=10:Disable channel; AA=11: Enable channel", the action flag indicated by AA in this byte is for the downstream wavelength channel; byte 6 corresponds to Upstream channel action request, and its bitmap can be represented as "UUUU00AA", wherein, "UUUU" is UWLCH ID (upstream wavelength channel identifier), "AA" is Action Flag, and is defined as "AA=00: No action requested; AA=01: Request channel status; AA=10: Disable channel; AA=11: Enable channel", the action flag indicated by AA in this byte is for the upstream wavelength channel; bytes 7-8 correspond to scheduled SFC, i.e. the 16 least significant bits of the superframe counter value of the PHY frame when the ONU has to commence a "disable channel" operation, wherein the specific value pertains to both downstream and upstream disable channel, or only upstream disable channel; bytes 9-40 correspond to padding content, set to 0x00 by the transmitter, and treated as "don't care" by the receiver; bytes 41-48 correspond to the MIC (Message integrity check), which is computed using the default PLOAM integrity key.

The above Table 2 shows the data format of the upstream PLOAM-channel action response message of an example of the present disclosure, the channel action response message is also called channel status and action result message because the channel action response message has a function of returning channel status and action result. As can be seen from Table 2, bytes 1-2 of the channel status and action result message correspond to ONU-ID, that is, an ONU identifier of a message receiver; byte 3 corresponds to message type identifier, the message type is "Channel status and response", and its hexadecimal representation is "0xxx"; byte 4 corresponds to sequence number (SeqNo), which is repeated from downstream Request Registration Message or 0 if generated in response to a ranging grant in the ranging state (O4); byte 5 corresponds to Channel identifier (Channel ID), and the bitmap form is "DDDDUUUU", wherein "DDDD" is DWLCH ID, and "UUUU" is UWLCH ID; byte 6 corresponds to Channel State, and the bitmap is "DDD00UUU", wherein "DDD" represents Downstream Channel State, and is defined as "DDD=000: Channel absence; DDD=001: Channel enabled; DDD=010: Channel disabled; DDD=011: Channel failure; DDD=100 . . . 111: Reserved, ignored on received", "UUU" represents Upstream Channel State, and is defined as "UUU=000: No channel; UUU=001: Channel enabled; UUU=010: Channel disabled; UUU=011: Channel failure; UUU=100 . . . 111: reserved, ignore on received"; byte 7 corresponds to Action Result, and the bitmap form is "DDD00UUU", wherein "DDD" represents Downstream Channel Action Result, and is defined as "DDD=000: No action requested; DDD=001: Action successful; DDD=010: Action failed; DDD=011: No change required, i.e. the channel is already in the request state; DDD=100: Invalid command, i.e., request for an operation on a non-existing channel; DDD=101 . . . 111: Reserved, ignored on received, "UUU" represents Upstream Channel Action Result, and is defined as "UUU=000: No action requested; UUU=001: Action successful; UUU=010: Action failed; UUU=011: No change required, i.e. the channel is already in the request state; UUU=100: Invalid command, i.e., request for an operation on a non-existing channel; UUU=101 . . . 111: Reserved, ignore on received"; bytes 8-40 correspond to padding, set to 0x00 by the transmitter, and treated as "don't care" by the receiver; bytes 41-48 correspond to the MIC, which is computed using the default PLOAM integrity key.

Each channel action message in the present disclosure may adopt the data format shown in Table 1, and each channel action response message may adopt the data format shown in Table 2. It should be noted that the channel action message shown in Table 1 and the channel status action response message shown in table 2 are only examples, and are not limited to the present disclosure, and in practical applications, the data format of the channel action message and the corresponding channel action response message may be defined based on requirements, so that the channel action message and the corresponding channel action response message can support functions of disabling a channel and/or enabling a channel and/or querying channel status.

2) information interaction for channel management is implemented based on the OMCI protocol The following exemplarily provides a variety of implementation manners of information interaction for implementing channel management based on the OMCI protocol.

a) extending new attributes in existing OMCI message(s)

As an example: TWDM channel management entity provides anchor point for the ME involved in the collection of PM statistical information for each TWDM channel, the instance of the TWDM channel management entity is instantiated by the ONU autonomously, a plurality of new attributes can be expanded in the TWDM Channel management entity, each new attribute corresponds to at least one item of channel action messages or at least one item of channel action response messages, and the attributes of the expanded TWDM Channel management entity include Managed entity ID, Active Channel indication, Operational Channel indication, Downstream wavelength channel, Upstream wavelength Channel, Specific wavelength Channel action flag, Scheduled SFC, ONU Channel status and action result. Wherein, the Managed entry ID is used for uniquely identifying each instance of the ME, which is 2 bytes, and is represented as 0xSSBB, where SS represents ONU slot ID, and BB represents TWDM channel ME number allocated by the ONU itself, and is arranged in ascending order from 0; Active channel indication, the default value is false, ONU will set the attribute to true when receiving a Channel_Profile PLOAM message of the channel, and ONU will clear the attribute when receiving a Channel_Profile PLOAM message marked with 'void' of the channel, the attribute is 1 byte; Operational channel indication, a boolean attribute, set to true for the active TWDM channel currently running on the ONT, the operation statistics are accumulated in the PM history data ME associated with the TWDM channel, this attribute is 1 byte; Downstream wavelength channel, for an active TWDM channel, the attribute identity refers to downstream wavelength channel of table 11-2 of [ITU-T G.989.2], for an inactive channel, its value is 0xFF; Upstream wavelength channel, for an active TWDM channel, the attribute identity refers to upstream wavelength channel of table VIII-5 of [ITU-T G.989.2], for an invalid channel, its value is 0xFF. Wherein, Specific wavelength channel action flag, Scheduled SFC, ONU Channel status and Action result are new extended attributes; Specific wavelength channel action flag attribute is used to request specific channel status of ONU, disable channel, enable channel, and the attribute is 2 bytes, a bitmap form of byte 1 is "DDDDUUUU", DDDD "is DWLCH ID of a specific channel, "UUUU" is UWLCH ID of a specific channel, a bitmap form of byte 2 is "AA0000BB", AA is defined as "AA=00: No action requested; AA=01: Request downstream channel status; AA=10: Disabled downstream channel; AA=11: Enable downstream channel", BB is defined as "BB=00: No action requested; BB=01: Request upstream channel status; BB=10: Disable upstream channel; BB=11: Enable upstream channel"; Scheduled SFC attribute, OLT uses this attribute to inform ONU when to perform disable or enable specific downstream and upstream channel operations, the attribute is 2 bytes, the value of which is the 16 least significant bits of the superframe counter value of the PHY frame when the ONU has to commence "disable channel" operation, the specific value pertains to both downstream and upstream disable channel, or only to upstream disable channel; ONU Channel status and Action result attribute is used to report specific downstream and upstream Channel status and report upstream and downstream action result of specific Channel, the attribute is 3 bytes, the bitmap form of the first byte is "DDDDUUUU", "DDDD" is DWLCH ID of specific channel, "UUUU" is UWLCH ID of specific channel, the bitmap form of the second byte is "AAA00BBB", AAA represents downstream channel status, and is defined as "AAA=000: Channel absent; AAA=001: Channel enabled; AAA=010: Channel disabled; AAA=011: Channel failure; AAA=100 . . . 111: Reserved, ignored on reception", BBB represents upstream channel status, and is defined as "BBB=000: Channel absent; BBB=001: Channel enabled; BBB=010: Channel disabled; BBB=011: Channel failure; BBB=100 . . . 111: Reserved, ignored on reception", the bitmap form of the third byte is "RRR00SSS", RRR represents downstream channel action result, and is defined as "RRR=000: No action requested; RRR=001: Action succeeded; RRR=010: Action failed; RRR=011: No change required, i.e., the channel is already in the requested state; RRR=100: Invalid command, i.e., request for an operation on a non-existing channel; RRR=101 . . . 111: Reserved, ignored on reception", SSS represents upstream channel action result, and is defined as "SSS=000: No action requested; SSS=001: Action succeeded; SSS=010: the Action failed; SSS=011: No change required, i.e., the channel is already in the requested state; SSS=100: Invalid command, i.e., request for an operation on a non-existing channel; SSS=101 . . . 111: Reserved, ignored on reception".

b) a first management entity is newly created, and the attributes of the first management entity include a management entity identifier, DWLCH, UWLCH, and a plurality of first attributes, wherein each first attribute corresponds to at least one item of the channel action message or at least one item of the channel action response message. The first management entity may provide OLT with functions of requesting channel status of ONU, disabling wavelength channel of ONU, enabling wavelength channel of ONU, and providing ONU with functions of responding to a current channel status and an action result of the OLT. The one or more instances of the first management entity are implicitly associated with the TWDM system profile ME, the number of instances created is announced by the TWDM channel total attribute of the TWDM system profile ME.

As an example, create TWDM channel operation entry includeing the following attributes: Managed entity ID, Downstream wavelength channel, Upstream wavelength channel, Specific wavelength channel action flag, Scheduled SFC. ONU Channel status and Action result; wherein, each attribute in the TWDM channel operation entry is defined the same as the attribute with the same name in the foregoing implementation manner a), and is not described again here.

c) a second management entity and a third management entity are newly created, the attributes of the second management entity include a management entity identifier, DWLCH, UWLCH, and a plurality of second attributes, wherein each second attribute corresponds to at least one item of the channel action message; the attributes of the third management entity include a management entity identifier, DWLCH, UWLCH, and a plurality of third attributes, wherein each third attribute corresponds to at least one item of the channel action response message. The second management entity is used for providing OLT with the functions of requesting channel status of ONU, disabling wavelength channel of ONU and enabling wavelength channel of ONU, the third management entity is used for providing ONU with the function of responding to the current channel status and the action result of OLT.

As an example, two MEs are newly created as follows: TWDM channel operation entry-1 and TWDM channel operation entry-2. Wherein, the TWDM channel operation entry-1 provides OLT with the functions of requesting channel status of ONU, disabling wavelength channel of ONU and enabling wavelength channel of ONU, the TWDM channel operation entry-2 provides ONU with the functions of responding to the current channel status and the action result of the OLT. Wherein, the TWDM channel operation entry-1 includes the following attributes: Managed entity ID, Downstream wavelength channel, Upstream wavelength channel, Specific wavelength channel action flag, Scheduled SFC. Wherein, the TWDM channel operation entry-2 includes the following attributes: Managed entity ID, Downstream wavelength channel, Upstream wavelength channel, ONU Channel status and Action result. Wherein, the definition of each attribute in the two MEs is the same as that of the attribute with the same name in the foregoing implementation manner a), and is not described herein again.

The present disclosure further provides a system for channel management in a passive optical network, where the system comprises an optical line terminal and an optical network unit, and the optical network unit includes the apparatus for channel management described in the present disclosure.

According to the scheme of the disclosure, a state machine of timing and handshake mechanism after ONU performs the operation of disabling channel or enabling channel is provided, so that ONU can quickly recover the service after disabling the channel; and/or, channel action message and channel action response message that support disabling channel, enabling channel and inquiring channel status are proposed for GPON type OLT and ONU.

Figure 4:
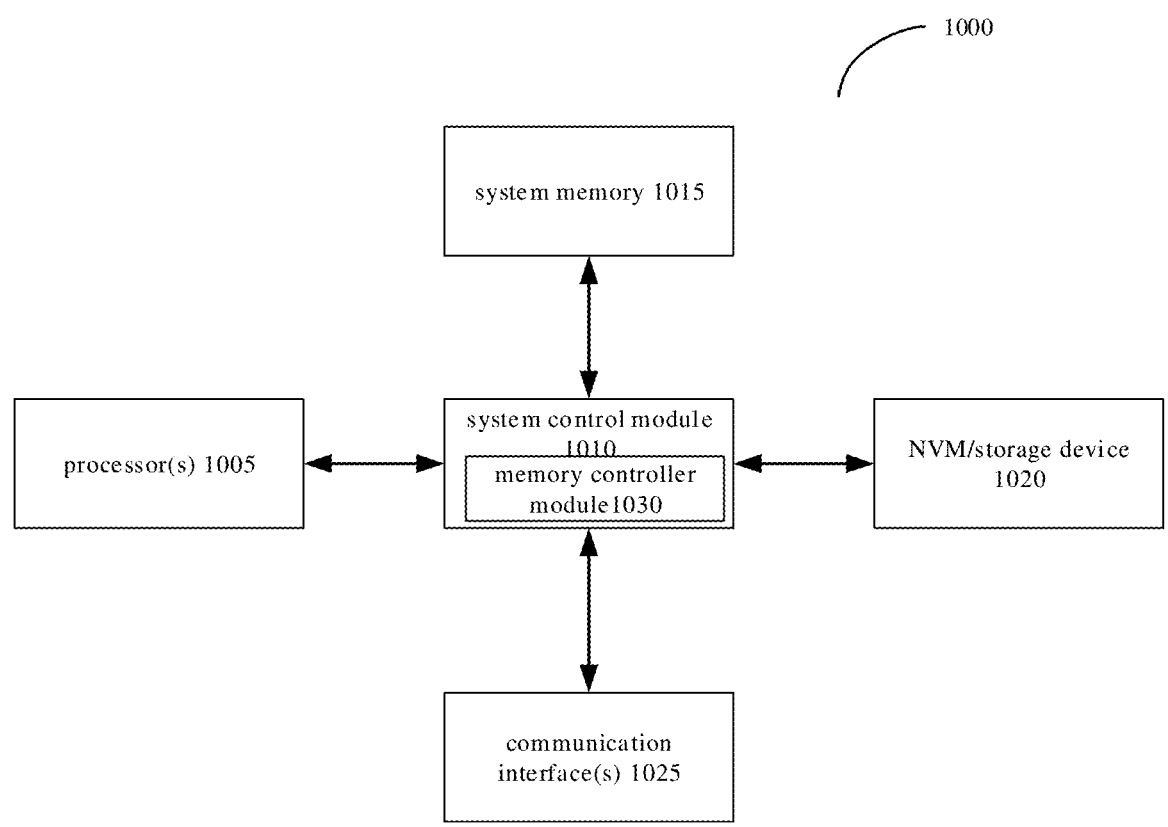
FIG. 4 shows an exemplary system that can be used to implement the various embodiments described in the present disclosure.

FIG. 4 shows an exemplary system that can be used to implement the various embodiments described in the present disclosure.

In some embodiments, the system 1000 can be used as any processing device in the embodiments of the present disclosure. In some embodiments, system 1000 may include one or more computer readable media (e.g., system memory or NVM/storage device 1020) having instructions and one or more processors (e.g., processor(s) 1005) coupled with the one or more computer readable media and configured to execute the instructions to implement modules to perform the actions described in the present disclosure.

For one embodiment, system control module 1010 may include any suitable interface controller to provide any suitable interface to at least one of processor(s) 1005 and/or to any suitable device or component in communication with system control module 1010.

The system control module 1010 may include a memory controller module 1030 to provide an interface to the system memory 1015. Memory controller module 1030 may be a hardware module, a software module, and/or a firmware module.

System memory 1015 may be used to load and store data and/or instructions, for example, for system 1000. For one embodiment, system memory 1015 may include any suitable volatile memory, such as suitable DRAM. In some embodiments, system memory 1015 may include a Double Data Rate type Fourth Synchronous Dynamic Random Access Memory (DDR4 SDRAM).

For one embodiment, system control module 1010 may include one or more input/output (I/O) controllers to provide an interface to NVM/storage device 1020 and communication interface(s) 1025.

For example, NVM/storage device 1020 may be used to store data and/or instructions. NVM/storage device 1020 may include any suitable non-volatile memory (e.g., flash memory) and/or may include any suitable non-volatile storage device(s) (e.g., one or more hard disk drives (HDD), one or more Compact Disc (CD) drives, and/or one or more Digital Versatile Disc (DVD) drives).

NVM/storage device 1020 may include storage resources that are physically part of the device on which system 1000 is installed, or it may be accessible by the device and not necessarily to be part of the device. For example, NVM/storage device 1020 may be accessed via the communication interface(s) 1025 through the network.

Communication interface(s) 1025 may provide an interface for system 1000 to communicate via one or more networks and/or with any other suitable devices. System 1000 may wirelessly communicate with one or more components of a wireless network according to any of one or more wireless network standards and/or protocols.

For one embodiment, at least one of the processor(s) 1005 may be packaged together with logic for one or more controller(s) (e.g., memory controller module 1030) of the system control module 1010. For one embodiment, at least one of the processor(s) 1005 may be packaged together with logic for one or more controller(s) of the system control module 1010 to form a System in Package (SiP). For one embodiment, at least one of the processor(s) 1005 may be integrated with logic for one or more controller(s) of the system control module 1010 on the same mold. For one embodiment, at least one of the processor(s) 1005 may be integrated with logic for one or more controller(s) of system control module 1010 on the same mold to form a system on chip (SoC).

In various embodiments, the system 1000 may be, but is not limited to being: a server, a workstation, a desktop computing device, or a mobile computing device (for example, a laptop computing device, a handheld computing device, a tablet, a netbook, etc.). In various embodiments, the system 1000 may have more or fewer components and/or different architectures. For example, in some embodiments, the system 1000 includes one or more cameras, a keyboard, a Liquid Crystal Display (LCD) screen (including a touch screen display), a non-volatile memory port, multiple antennas, a graphics chip, an Application Specific Integrated Circuit (ASIC), and speakers.

The present disclosure also provides an optical network unit, where the optical network unit comprises: a memory for storing one or more programs; one or more processors connected with the memory, the one or more programs, when executed by the one or more processors, cause the one or more processors to perform the method for channel management described in the present disclosure.

The present disclosure also provides a computer readable storage medium storing a computer program, which when executed by a processor, cause the processor to perform the method for channel management described in the present disclosure.

The present disclosure also provides a computer program product, which when executed by a device, cause the device to perform the method for channel management described in the present disclosure.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

Although exemplary embodiments have been specifically shown and described above, those skilled in the art will appreciate that there may be changes in their form and details without departing from the spirit or scope of the claims. The protection sought herein is described in the appended claims. These and other aspects of the various embodiments are specified in the following numbering items:

1. A method for channel management in an optical network unit, wherein the method comprises:

receiving a disable channel action message sent by an optical line terminal, wherein the disable channel action message is used to instruct disabling a first channel of the optical network unit;

transferring the state machine of the optical network unit on the first channel from the association substate of the operation state to the pending substate according to the disable channel action message;

and turning off the transmitter and/or the receiver on the first channel after a specified time is reached, transferring the state machine from the pending substate of the operation state to the disabling channel status, and starting a timer.

2. The method according to item 1, wherein the method further comprises:

enabling the first channel according to an enable channel action message if the enable channel action message for enabling the first channel is received before the timer expires;

transferring the state machine from the disabling channel status to the profile learning substate of the downstream tuning state if a downstream synchronization signal is received on the first channel before the timer expires;

transferring the state machine from the profile learning sub state of the downstream tuning state to the upstream tuning state when the downstream wavelength channel of the first channel works normally;

sending an action response message for action confirmation to the optical line terminal when the upstream wavelength channel of the first channel works normally;

transferring the state machine from the upstream tuning state to the operation state.

3. The method according to item 2, wherein the method further comprises:

transferring the state machine from the disabling channel status to the profile learning substate of the initial state if the enable channel action message is not received before the timer expires; or, transferring, after receiving the enable channel action message, the state machine from the disabling channel status to the profile learning substate of the initial state if a downstream synchronization signal is not received on the first channel before the timer expires.

4. The method according to item 2 or 3, wherein the enable channel action message and the disable channel action message use the same data format; wherein the enable channel action message and the disable channel action message include at least any one of: ONU-ID, message type identifier, DWLCH identifier, UWLCH identifier, upstream action flag, downstream action flag, scheduled SFC, padding, message integrity check; wherein the enable channel action response message includes at least any one of: ONU-ID, message type identifier, sequence number, DWLCH identifier, UWLCH identifier, upstream channel status, downstream channel status, action result, padding, message integrity check.

5. The method according to any of items 1 to 4, wherein the method further comprises:

transferring the state machine from the disabling channel status to the profile learning substate of the initial state if a deactivate ONU-ID request sent by the optical line terminal is received before the timer expires;

transferring the state machine from the disabling channel status to the emergency stop state if a disable SN request sent by the optical line terminal is received before the timer expires.

6. The method according to item 1, wherein the disable channel action message carries scheduled SFC, said turning off the transmitter and/or the receiver on the first channel after a specified time is reached, comprising:

turning off the transmitter and/or the receiver on the first channel when it is determined that a specified time is reached according to the scheduled SFC.

7. The method according to any of items 1 to 6, wherein the method further comprises:

receiving an inquiry channel action message sent by the optical line terminal, wherein the inquiry channel action message is used for inquiring the channel status of ONU channel;

returning an inquiry channel action response message to the optical line terminal according to the inquiry channel action message, wherein the inquiry channel action response message is used for indicating the channel status of ONU channel.

8. The method according to item 7, wherein the inquiry channel action message and the disable channel action message use the same data format; wherein the inquiry channel action message and the disable channel action message include at least any one of: ONU-ID, message type identifier, DWLCH identifier, UWLCH identifier, upstream action flag, downstream action flag, scheduled SFC, padding, message integrity check; wherein the inquiry channel action response message includes at least any one of: ONU-ID, message type identifier, sequence number, DWLCH identifier, UWLCH identifier, upstream channel status, downstream channel status, action result, padding, message integrity check.

9. The method according to any of items 1 to 8, wherein the information interaction for channel management is implemented based on the PLOAM protocol.

10. The method according to any of items 1 to 8, wherein the information interaction for channel management is implemented based on the OMCI protocol.

11. The method according to item 10, wherein a plurality of new attributes are extended in the TWDM channel management entity, each new attribute corresponding to at least one item of the channel action message or at least one item of the channel action response message.

12. The method according to item 10, wherein a first management entity is newly created, and the attributes of the first management entity include a management entity identifier, DWLCH, UWLCH, and a plurality of first attributes, wherein each first attribute corresponds to at least one item of the channel action message or at least one item of the channel action response message.

13. The method according to item 10, wherein a second management entity and a third management entity are newly created, and the attributes of the second management entity include a management entity identifier, DWLCH, UWLCH, and a plurality of second attributes, wherein each second attribute corresponds to at least one item of the channel action message; the attributes of the third management entity include a management entity identifier, DWLCH, UWLCH, and a plurality of third attributes, wherein each third attribute corresponds to at least one item of the channel action response message.

14. A method for channel management, wherein the method comprises:

an optical line terminal sends a disable channel action message to an optical network unit, wherein the disable channel action message is used to instruct disabling a first channel of the optical network unit;

the optical network unit receives the disable channel action message sent by the optical line terminal;

the optical network unit transfers the state machine of the optical network unit on the first channel from the association substate of the operation state to the pending substate according to the disable channel action message;

the optical network unit turns off the transmitter and/or the receiver on the first channel after a specified time is reached, transfers the state machine from the pending substate of the operation state to the disabling channel status, and starts a timer.

15. An apparatus for channel management in an optical network unit, wherein the apparatus comprises:

means for receiving a disable channel action message sent by an optical line terminal, wherein the disable channel action message is used to instruct disabling a first channel of the optical network unit;

means for transferring the state machine of the optical network unit on the first channel from the association substate of the operation state to the pending substate according to the disable channel action message;

means for turning off the transmitter and/or the receiver on the first channel after a specified time is reached, transferring the state machine from the pending substate of the operation state to the disabling channel status, and starting a timer.

16. The apparatus of item 15, wherein the apparatus is further for:

enabling the first channel according to an enable channel action message if the enable channel action message for enabling the first channel is received before the timer expires;

transferring the state machine from the disabling channel status to the profile learning substate of the downstream tuning state if a downstream synchronization signal is received on the first channel before the timer expires;

transferring the state machine from the profile learning sub state of the downstream tuning state to the upstream tuning state when the downstream wavelength channel of the first channel works normally;

sending an action response message for action confirmation to the optical line terminal when the upstream wavelength channel of the first channel works normally;

transferring the state machine from the upstream tuning state to the operation state.

17. The apparatus according to item 16, wherein the apparatus is further for:

transferring the state machine from the disabling channel status to the profile learning substate of the initial state if the enable channel action message is not received before the timer expires; or, the first and second liquid crystal display panels may be, transferring, after receiving the enable channel action message, the state machine from the disabling channel status to the profile learning substate of the initial state if a downstream synchronization signal is not received on the first channel before the timer expires.

18. The apparatus according to item 16 or 17, wherein the enable channel action message and the disable channel action message use the same data format; wherein the enable channel action message and the disable channel action message include at least any one of: ONU-ID, message type identifier, DWLCH identifier, UWLCH identifier, upstream action flag, downstream action flag, scheduled SFC, padding, message integrity check; wherein the enable channel action response message includes at least any one of: ONU-ID, message type identifier, sequence number, DWLCH identifier, UWLCH identifier, upstream channel status, downstream channel status, action result, padding, message integrity check.

19. The apparatus according to any of items 15 to 18, wherein the apparatus is further for:

transferring the state machine from the disabling channel status to the profile learning substate of the initial state if a deactivate ONU-ID request sent by the optical line terminal is received before the timer expires;

transferring the state machine from the disabling channel status to the emergency stop state if a disable SN request sent by the optical line terminal is received before the timer expires.

20. The apparatus according to item 15, wherein the disable channel action message carries scheduled SFC, said turning off the transmitter and/or the receiver on the first channel after a specified time is reached, comprising:

turning off the transmitter and/or the receiver on the first channel when it is determined that a specified time is reached according to the scheduled SFC.

21. The apparatus according to any of items 15 to 20, wherein the apparatus is further for:

receiving an inquiry channel action message sent by the optical line terminal, wherein the inquiry channel action message is used for inquiring the channel status of ONU channel;

returning an inquiry channel action response message to the optical line terminal according to the inquiry channel action message, wherein the inquiry channel action response message is used for indicating the channel status of ONU channel.

22. The apparatus according to item 21, wherein the inquiry channel action message and the disable channel action message use the same data format; wherein the inquiry channel action message and the disable channel action message include at least any one of: ONU-ID, message type identifier, DWLCH identifier, UWLCH identifier, upstream action flag, downstream action flag, scheduled SFC, padding, message integrity check; wherein the inquiry channel action response message includes at least any one of: ONU-ID, message type identifier, sequence number, DWLCH identifier, UWLCH identifier, upstream channel status, downstream channel status, action result, padding, message integrity check.

23. The apparatus according to any of items 15 to 22, wherein the information interaction for channel management is implemented based on a the PLOAM protocol.

24. The apparatus of any of items 15 to 22, wherein the information interaction for channel management is implemented based on the OMCI protocol.

25. The apparatus of item 24, wherein a plurality of new attributes are extended in the TWDM channel management entity, each new attribute corresponding to at least one item of the channel action message or at least one item of the channel action response message.

26. The apparatus according to item 24, wherein a first management entity is newly created, and the attributes of the first management entity include a management entity identifier, DWLCH, UWLCH, and a plurality of first attributes, wherein each first attribute corresponds to at least one item of the channel action message or at least one item of the channel action response message.

27. The apparatus according to item 24, wherein a second management entity and a third management entity are newly created, and the attributes of the second management entity include a management entity identifier, DWLCH, UWLCH, and a plurality of second attributes, wherein each second attribute corresponds to at least one item of the channel action message; the attributes of the third management entity include a management entity identifier, DWLCH, UWLCH, and a plurality of third attributes, wherein each third attribute corresponds to at least one item of the channel action response message.

28. A system for channel management in a passive optical network, wherein the system comprises an optical line terminal and an optical network unit, the optical network unit comprises the apparatus according to any of items 15 to 27.

29. An optical network unit, wherein the optical network unit comprises:

a memory for storing one or more programs;

one or more processors connected with the memory, the one or more programs, when executed by the one or more processors, cause the one or more processors to perform the following operations:

receiving a disable channel action message sent by an optical line terminal, wherein the disable channel action message is used to instruct disabling a first channel of the optical network unit;

transferring the state machine of the optical network unit on the first channel from the association substate of the operation state to the pending substate according to the disable channel action message;

and turning off the transmitter and/or the receiver on the first channel after a specified time is reached, transferring the state machine from the pending substate of the operation state to the disabling channel status, and starting a timer.

30. A computer readable storage medium storing a computer program, which when executed by a processor, cause the processor to perform the following operations:

receiving a disable channel action message sent by an optical line terminal, wherein the disable channel action message is used to instruct disabling a first channel of the optical network unit;

transferring the state machine of the optical network unit on the first channel from the association substate of the operation state to the pending substate according to the disable channel action message;

and turning off the transmitter and/or the receiver on the first channel after a specified time is reached, transferring the state machine from the pending substate of the operation state to the disabling channel status, and starting a timer.

31. A computer program product, which when executed by a device, causes the device to perform the following operations:

receiving a disable channel action message sent by an optical line terminal, wherein the disable channel action message is used to instruct disabling a first channel of the optical network unit;

transferring the state machine of the optical network unit on the first channel from the association substate of the operation state to the pending substate according to the disable channel action message;

and turning off the transmitter and/or the receiver on the first channel after a specified time is reached, transferring the state machine from the pending substate of the operation state to the disabling channel status, and starting a timer.

The invention claimed is:

1. A method for channel management in an optical network unit, wherein the method comprises:

receiving a disable channel action message sent by an optical line terminal, wherein the disable channel action message is used to instruct disabling a first channel of the optical network unit;

transferring a state of the optical network unit on the first channel from an operation state to a pending state according to the disable channel action message;

receiving an inquiry channel action message sent by the optical line terminal, wherein the inquiry channel action message is used for inquiring a channel status of an Optical Network Unit (ONU) channel; and returning an inquiry channel action response message to the optical line terminal according to the inquiry channel action message, wherein the inquiry channel action response message is used for indicating the channel status of the ONU channel.

2. The method according to claim 1, wherein the method further comprises:

turning off a transmitter and/or a receiver on the first channel after a specified time is reached, transferring a state machine from the pending substate of the operation state to a disabling channel status, and starting a timer.

3. The method according to claim 2, wherein the method further comprises:

enabling the first channel according to an enable channel action message if the enable channel action message for enabling the first channel is received before the timer expires;

transferring the state of the optical network unit on the first channel from the disabling channel status to a profile learning substate of a downstream tuning state if a downstream synchronization signal is received on the first channel before the timer expires;

transferring the state of the optical network unit on the first channel from the profile learning substate of the downstream tuning state to an upstream tuning state in response to a downstream wavelength channel of the first channel working normally;

sending an enable channel action response message for action confirmation to the optical line terminal in response to an upstream wavelength channel of the first channel working normally; and transferring the state of the optical network unit on the first channel from the upstream tuning state to the operation state.

4. The method according to claim 3, wherein the method further comprises:

transferring the state of the optical network unit on the first channel from the disabling channel status to a profile learning substate of an initial state if the enable channel action message is not received before the timer expires; or, transferring, after receiving the enable channel action message, the state of the optical network unit on the first channel from the disabling channel status to the profile learning substate of the initial state if a downstream synchronization signal is not received on the first channel before the timer expires.

5. A method according to claim 3, wherein the enable channel action message and the disable channel action message use a same data format; wherein the enable channel action message and the disable channel action message include at least any one of: Optical Network Unit IDentifier (ONU-ID), message type identifier, wavelength channel (WLCH) identifier, action flag, padding, or message integrity check; wherein the enable channel action response message includes at least any one of: ONU-ID, message type identifier, sequence number, WLCH identifier, channel status, action result, padding, or message integrity check.

6. The method according to claim 2, wherein the method further comprises:

transferring the state machine from the disabling channel status to a profile learning substate of an initial state if a deactivate ONU-ID request sent by the optical line terminal is received before the timer expires; and transferring the state machine from the disabling channel status to an emergency stop state if a disable Serial Number (SN) request sent by the optical line terminal is received before the timer expires.

7. The method according to claim 2, wherein the disable channel action message carries scheduled Surface Function Chaining (SFC), and said turning off the transmitter and/or the receiver on the first channel after a specified time is reached, comprising:

turning off the transmitter and/or the receiver on the first channel in response to determining that a specified time is reached according to the scheduled SFC.

8. The method according to claim 2, wherein the inquiry channel action message and the disable channel action message use a same data format; wherein the inquiry channel action message and the disable channel action message include at least any one of: ONU-ID, message type identifier, WLCH identifier, action flag, padding, or message integrity check; wherein the inquiry channel action response message includes at least any one of: ONU-ID, message type identifier, sequence number, WLCH identifier, upstream channel status, downstream channel status, action result, padding, or message integrity check.

9. The method according to claim 1, wherein an information interaction for channel management is implemented based on a Physical Layer Operations, Administration and Maintenance (PLOAM) protocol.

10. The method according to claim 1, wherein an information interaction for channel management is implemented based on a ONU Management and Control Interface (OMCI) protocol.

11. The method according to claim 10, wherein a plurality of new attributes are extended in a Time and Wavelength Division Multiplexed (TWDM) channel management entity, each new attribute corresponding to at least one item of the disable channel action message or at least one item of a first channel action response message.

12. The method according to claim 10, wherein a first management entity is newly created, and new attributes of the first management entity include a management entity identifier, Downstream Wavelength channel (DWLCH), Upstream Wavelength Channel (UWLCH), and a plurality of first attributes, wherein each of the first attributes corresponds to a respective at least one item of a channel action message or at least one item of a channel action response message.

13. The method according to claim 10, wherein a second management entity and a third management entity are newly created, new attributes of the second management entity include a management entity identifier, DWLCH, UWLCH, and a plurality of second attributes, each of the second attributes corresponds to a respective at least one item of the channel action message, new_attributes of the third management entity include a management entity identifier, DWLCH, UWLCH, and a plurality of third attributes, and each of the third attributes corresponds to a respective at least one item of the channel action response message.

14. An optical network unit, wherein the optical network unit comprises:

a memory for storing one or more programs;

one or more processors connected with the memory, the one or more programs, when executed by the one or more processors, cause the one or more processors to perform the following operations, receiving a disable channel action message sent by an optical line terminal, wherein the disable channel action message is used to instruct disabling a first channel of the optical network unit;

transferring a state of the optical network unit on the first channel from an operation state to a pending state according to the disable channel action message receiving an inquiry channel action message sent by the optical line terminal, wherein the inquiry channel action message is used for inquiring the channel status of Optical Network Unit (ONU) channel; and returning an inquiry channel action response message to the optical line terminal according to the inquiry channel action message, wherein the inquiry channel action response message is used for indicating a channel status of an ONU channel.

15. A non-transitory computer readable storage medium storing a computer program, which when executed by a processor, cause the processor to perform the following operations:

receiving a disable channel action message sent by an optical line terminal, wherein the disable channel action message is used to instruct disabling a first channel of an optical network unit;

transferring a state of the optical network unit on the first channel from an operation state to a pending state according to the disable channel action message;

receiving an inquiry channel action message sent by the optical line terminal, wherein the inquiry channel action message is used for inquiring the channel status of Optical Network Unit (ONU) channel; and returning an inquiry channel action response message to the optical line terminal according to the inquiry channel action message, wherein the inquiry channel action response message is used for indicating a channel status of an ONU channel.

\* \* \* \* \*